United States Patent Office

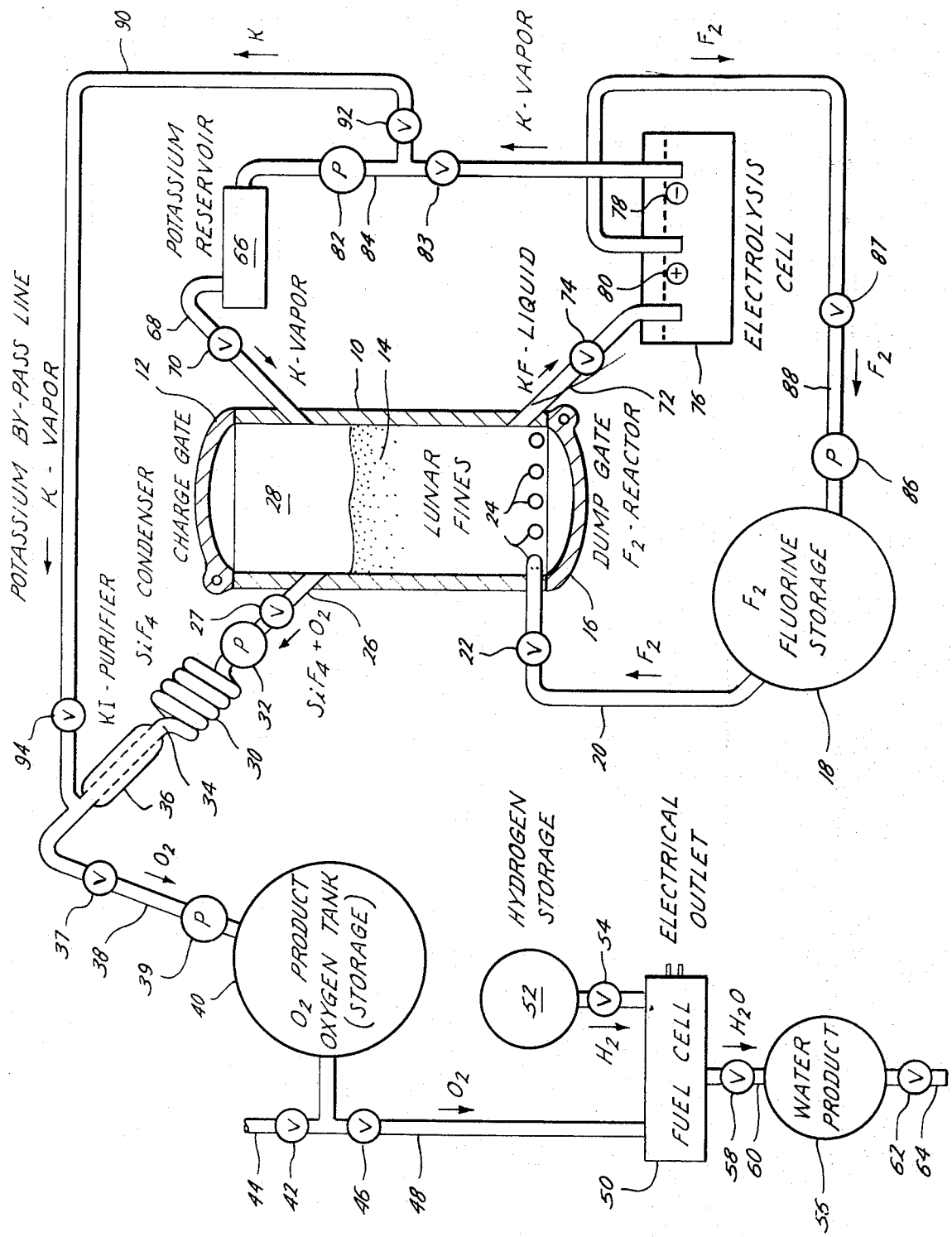

3,773,913
Patented Nov. 20, 1973

3,773,913
METHOD FOR OBTAINING OXYGEN FROM LUNAR OR SIMILAR SOIL
William R. Downs, Houston, Tex., assignor to the United States of America as represented by the Administrator of the National Aeronautics and Space Administration
Filed Feb. 28, 1972, Ser. No. 229,916
Int. Cl. C01b 13/00; C22b 21/00, 45/00
U.S. Cl. 423—579
4 Claims

ABSTRACT OF THE DISCLOSURE

Recovery of oxygen from soil containing metal oxides such as alumina, silica, calcia, magnesia, and ilmenite wherein the material containing the oxides is placed in a vessel and reacted with fluorine to provide oxygen and metal fluorides. The oxygen produced from this reaction is recovered and stored, after further purifying processes, and the metal fluorides are further reacted with potassium vapor to provide potassium fluoride and free metals. The potassium fluoride is then subjected to electrolysis whereby the potassium and fluorine are separated and are recycled for further use in the system. Valuable free metals are recovered for other uses.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

The present invention is directed to a method and apparatus for obtaining oxygen from surface material such as lunar soil in the course of lunar exploration although the invention is suitable for use in any circumstance wherein it is desired to obtain oxygen from metal oxides and minerals containing oxygen.

As evidenced by exploration of the Earth's moon, there is no appreciable free oxygen on the lunar surface and no appreciable water from which oxygen can be readily obtained. However, oxygen contained in minerals such as ilmenite and in the form of metal oxides such as alumina, silica, calcia, and magnesia has been found in substantial quantities on the lunar surface and offers the potential of supporting lunar activities as well as wider ranging space exploration. Consequently, it is highly advantageous to provide a method and apparatus by which oxygen can be obtained, not only from earthly materials but also from these oxides found in the moon's crust and surface materials, and the present invention is directed to such end.

One proposed method of recovering oxygen and/or water from lunar surface material is described by McKay et al. in their U.S. patent application Ser. No. 87,223, filed for "Obtaining Oxygen and/or Water From Lunar or Similar Soil."

The method proposed therein is directed to the reduction of iron oxide in ilmenite with hydrogen at elevated temperatures to drive off water, followed by collecting and using the water or subjecting it to electrolysis for the release of oxygen and the recovery of hydrogen. However, a major disadvantage of the hydrogen reduction process is the limited yield of oxygen since, as a practical matter, only the iron oxide-containing species can be reduced to obtain water. For example, a 100 gram sample of ilmenite reacted with hydrogen to reduce the iron oxide yields only the equivalent of about 3.2 grams of oxygen. Therefore, it would be desirable to provide a method for recovering oxygen from substantially all of the particulate matter constituting the lunar surface material so that oxygen could be recovered from the other metal oxides (as well as from the ilmenite) in not only substantially higher yields, but in a manner so that materials handling problems are minimized.

SUMMARY OF THE INVENTION

The present invention is directed to the processing of earth or extraterrestrial soil by reacting it with fluorine to produce oxygen and metal fluorides. The oxygen, after purifying processes, is collected and recovered while the metal fluorides are further reacted with potassium vapor to provide potassium fluoride and free metals. Oxygen may be reacted with fluorine to produce FLOX (fluorine-oxygen mixtures), a rocket fuel oxidizer. The potassium fluoride is then subjected to electrolysis so that potassium and fluorine are separated for recycling and further use in the system. By way of contrast with the hydrogen reduction method described above, the process of the present invention is capable of providing up to 42 grams of oxygen from 100 grams of lunar surface fines without the application of external heat.

It is, therefore, an object of the present invention to provide a process for obtaining oxygen from all surface materials, particularly extraterrestrial materials containing metal oxides, by reaction with fluorine to produce oxygen and metal fluorides whereby the oxygen is collected and recovered for various applications and the metal fluorides are processed for further use in the system.

A further object of the present invention is the provision of such a process for recovering oxygen from soil material containing metal oxides such as alumina, silica, ilmenite, calcia, and magnesia.

Still another object of the present invention is the provision of such a process wherein the potassium fluoride is subjected to electrolysis to separate the potassium and fluorine for recycle and further use in the system.

Yet a further object is the provision of such a process wherein the step of recovering oxygen is accomplished by passing the oxygen stream through a condenser to separate volatile residual fluorides by condensation and further contacting the oxygen stream with potassium iodide for removal of excess residual fluorine.

Another object of the present invention is the provision of an apparatus for recovering oxygen from material containing metal oxides such as alumina, silica, ilmenite, calcia, and magnesia, including means for reacting the material with fluorine whereby metal fluorides are formed and oxygen is released; means for purifying, collecting, and recovering the oxygen; means for recovering the fluorine from the metal fluorides; and further means for providing valuable free metals.

Other and further objects, features and advantages will be apparent in the following description of the preferred embodiment of the invention given for the purpose of disclosure and taken in conjunction with the accompanying drawing.

DESCRIPTION OF THE DRAWING

In the drawing forming a part of the disclosure herein, the single figure illustrates an apparatus for recovering oxygen from Earth and extraterrestrial materials and the like which contain metal oxides.

DESCRIPTION OF THE PREFERRED EMBODIMENT

Recovery of oxygen from surface soil, particularly extraterrestrial, offers significant possibilities from the standpoint of both life supported and mobility in space exploration. Processing of lunar surface materials to produce oxygen directly, using a continuous or batch-type method, means that this life-supporting element (oxygen) is available on the moon without requirements for electric power generation, except to recover fluorine for recycling purposes.

A critical need for rocket fuel on the moon is recognized, so that spacecraft can leave the moon and return to the moon without complete dependency on Earth-supplied fuels. The reaction products from the fluorine exchange with oxygen of the lunar soils contain mixtures of metallic fluorides, unreacted fluorine, metal oxyfluorides, and oxygen fluorides. This mixture is an excellent rocket oxidizer for hydrogen fuel and consequently the products from this invention can be used as such. Examples are the following:

$F_2$ (unused) $+ H_2 \rightarrow 2HF +$ energy
$OF_2$ (oxygen difluoride) $+ 2H_2 \rightarrow H_2O + 2HF +$ energy
$SiOF_2$ (silicon oxyfluoride) $+ 4H_2 \rightarrow$
$\qquad SiH_4 + H_2O - 2HF +$ energy
$MgF_2 + H_2 \rightarrow$ No reaction, but $MgF_2$ supplies
$\qquad\qquad\qquad\qquad\qquad$ means to fuel exhausts Water can easily be synthesized by reacting the oxygen derived from surface materials with hydrogen. Both oxygen and water are necessary for lunar mission support and for general support of lunar shelters, manned bases, and colonies. Consequently, a method and apparatus, such as provided by the present invention for obtaining oxygen from Earth and extraterrestrial surface materials, can provide immense advantages.

It has been found that a typical analysis of particulate material on the lunar surface (commonly referred to as "lunar fines") is as follows:

| | Percent by weight |
|---|---|
| Silica, $SiO_2$ | 43 |
| Alumina, $Al_2O_3$ | 13 |
| Titania, $TiO_2$ | 7 |
| Iron oxide, FeO | 16 |
| Magnesia, MgO | 8 |
| Calcium oxide, CaO | 12 |
| All others | 1 |

The iron oxide content of the lunar fines is present to a large degree in bound form with titania, as the mineral known as ilmenite ($FeO \cdot TiO_2$).

Oxygen can be recovered from the surface soil by reacting gaseous fluorine with the surface materials to produce metal fluorides and oxygen. Equations for reaction of gases fluorine with materials found on the lunar surface are as follows:

$2Al_2O_3 + 6F_2 \rightarrow 4AlF_3 + 3O_2$
$SiO_2 + 2F_2 \rightarrow SiF_4 + O_2$
$2FeO \cdot TiO_2 + 6F_2 \rightarrow 2TiF_4 + 2FeF_2 + 3O_2$
$2SiO_2 + 2F_2 \rightarrow 2SiOF_2 + O_2$
$2CaO + 2F_2 \rightarrow 2CaF_2 + O_2$
$2FeO + 2F_2 \rightarrow 2FeF_2 + O_2$
$2MgO + 2F_2 \rightarrow 2MgF_2 + O_2$
$TiO_2 + 2F_2 \rightarrow TiF_4 + O_2$
$2TiO_2 + 2F_2 \rightarrow 2TiOF_2 + O_2$ It will be noted that in these equations there is an exchange of fluorine for the oxygen in the lunar soil minerals in order to liberate the oxygen. These reactions will occur in the temperature range of 0° C. to 800° C. and pressure range of 100 torr to 1000 torr although measurable yields will begin at approximately 25° C. and 400 torr. An increase in reaction rates and yields occurs at the temperature and pressure increases, each reaction being exothermic. The preferred conditions are 760 torr fluorine pressure (initial) and at a temperature of 500° C. Under these conditions oxyfluorides do not exist, the exchange of fluorine being complete. The oxygen gas so produced is collected, purified, and recovered as will be explained hereafter.

The metal fluorides produced in the foregoing reactions are further reacted with potassium vapor to provide potassium fluoride and free metals as illustrated by the following equations:

$AlF_3 + 3K \rightarrow 3KF + Al$
$SiF_4 + 4K \rightarrow 4KF + Si$
$TiF_4 + 4K \rightarrow 4KF + Ti$
$FeF_2 + 2K \rightarrow 2KF + Fe$
$CaF_2 + 2K \rightarrow 2KF + Ca$
$MgF_2 + 2K \rightarrow 2KF + Mg$
$TiF_4 + 4K \rightarrow 4KF + Ti$ The conditions under which the potassium vapor reacts with the metal fluorides are at temperatures of 800° C. to 850° C. and at pressures of 100 torr to 280 torr. The preferred conditions are about 825° C. and 250 torr, but the precise values are not critical. The potassium fluoride so produced from the reaction of potassium vapor with metal fluorides is in the liquid state and is subjected to electrolysis, whereby potassium and fluorine are separated and may be recovered and recycled. Electrolysis of potassium fluoride occurs at temperatures from 900° to 930° C. and at pressures of 280 torr to 800 torr. The preferred conditions are about 915° C. and 760 torr, but these values also are not critical.

With reference to the drawing, the system of the present invention includes a means such as a batch loaded vessel 10 preferably formed of nickel to serve as a reactor. The reactor 10 is provided with a gate 12 through which may be charged lunar fines 14. The reactor also has a lower gate 16 which may be opened to dump or discharge spent lunar fines after processing. This discharge contains valuable free metals which may be recovered.

The reactor 10 is provided with a gaseous fluorine source such as a fluorine storage chamber 18 and a pipe or tube 20 with a valve 22 for vapor communication between the fluorine storage chamber 18 and the reactor. Preferably, the line 20 is provided interiorly of the vessel 10 with a series of discharge nozzles 24 through which fluorine may be diffused into intimate contact with the lunar fines 14. Of course, fluorine must be transported originally from Earth to the lunar surface.

In order to collect and recover oxygen from the reactor 10, a pipe 26 having a valve 27 provides communication between a condenser 30 and the vapor space 28 above the lunar fines in the reactor. The vapors evolved in the reactor 10 contain not only oxygen but silicon tetrafluoride, titanium tetrafluoride, and unreacted fluorine. Consequently, the condenser 30 condenses and separates the silicon and titanium tetrafluorides from the vapor stream, the vapor being pumped to the condenser 30 by means of a suitable pump 32.

The condenser 30, which is preferably maintained at about —100° C. and 760 torr, may be any suitable type of condenser in which silicon tetrafluoride and titanium tetrafluoride can be condensed and separated from oxygen and fluorine gases; hardened copper is excellent. Cooling for the condenser may be by any suitable means although the preferred means on the lunar surface is to expose the condenser to the shadow shading.

In series with the condenser 30 is a line 34 communicating with a column 36 which contains potassium iodide. The function of the potassium iodide column 36 is to receive the oxygen stream from the condenser 30 and react potassium iodide with any residual fluorine in the oxygen thereby forming potassium fluoride and liberating free iodine in crystalline form in the column. The potassium iodide purifier column 36 may be regenerated periodically as required by admission of potassium vapor to the column as will be explained hereafter. The purifying process performed by the condenser 30 and the potassium iodide column 36 may be performed at temperatures of from —120° C. to 50° C. and pressures of 100 torr to 1000 torr. The preferred conditions are about —100° C. and 760 torr, the exact values, however, not being critical.

From the potassium iodide purifier column 36, pure oxygen is pumped by means of the pump 39 through the pipe or line 38 to an oxygen storage chamber 40. Oxygen may be withdrawn for use by opening the valve 42 in the line 44. Alternately, the valve 46 in the line 48 may be opened to admit oxygen from the chamber 40 to a suitable fuel cell 50. In the fuel cell 50, the oxygen combines with hydrogen (which originally is provided by transport from Earth) drawn from a storage chamber 52 by opening valve 54 to generate electricity for desired purposes. Water is formed and is drawn off to a water product tank 56 by opening valve 58 in the line 60. Water is a highly desired product on the lunar surface and may be withdrawn for use from the tank 56 by opening the valve 62 in line 64.

For purposes of recovering fluorine from the reaction products in the reactor vessel 10, a potassium vapor source is provided including a potassium vapor reservoir or storage chamber 66 from which potassium vapor may be withdrawn at 800° C. to 850° C. and pressure of 100 torr to 280 torr (preferably at about 825° C. and 250 torr) by means of the pipe 68 and passed into the interior of the reactor 10 by opening the valve 70. In so doing, the potassium vapor reacts with the metal fluorides to produce potassium fluoride as a liquid.

The potassium fluoride liquid is withdrawn from the reactor 10 by means of a pipe 72 having a valve 74 therein. The pipe 72 provides liquid communication between the reactor 10 and a suitable electrolysis cell 76 schematically illustrated in the drawing. Any source of electricity may be used for the electrolysis cell although a nuclear power source is most suitable for use on the lunar surface.

As a result of subjecting the potassium fluoride liquid to electrolysis in the cell 76, potassium vapor is evolved at the negative electrode 78 and fluorine gas is evolved at the positive electrode 80. The potassium vapor is pumped by means of a pump 82 in the line 84 into the potassium reservoir 66 for further use in the reactor 10. The fluorine gas is pumped by means of the pump 86 in the line 88 into the fluorine storage chamber 18 for recycling into the reactor 10.

Connecting with the potassium vapor line 84 is a bypass line 90 having valves 92 and 94 therein in order that potassium vapor may be passed to the potassium iodide purifier column 36 when necessary for regeneration of the column by reacting with the iodide crystals to form further potassium iodide.

In operation, a batch of Earth or lunar fines material is charged to the reactor 10 through the gate 12 and the reactor is then sealed. Fluorine gas, preferably at about 760 torr and 500° C., is admitted to the reactor by opening the valve 22 in the line 20 so that gas passes from the fluorine storage chamber 18. The fluorine gas is pressurized as necessary by means of the pump 86. Reaction ensues vigorously between the fluorine and the metal oxides of the lunar fines 14 in the reactor 10 yielding metal fluorides and oxygen gas. Silicon tetrafluoride from reaction of silica with fluorine, and titanium tetrafluoride from reaction of titania with fluorine, are gases and pass, together with the oxygen and any residual fluorine, through the line 26 by means of the pump 32 into the condenser 30. Of course, the valve 27 is open while the valves 70 and 74 are closed.

Silicon tetrafluoride and titanium tetrafluoride are condensed from the oxygen and residual fluorine stream in the condenser 30 operating about −100° C. and 760 torr while the oxygen and fluorine pass through the line 34 into the potassium iodide purifier column 36. When evolution of oxygen from the reactor 10 has ceased, the silicon tetrafluoride and titanium tetrafluoride in the condenser 30 are returned to the reactor 10 via the pipe 26, by allowing the condenser temperature to rise to about 300° C.

With valve 37 open and valve 94 closed, the oxygen, in relatively pure state, passes to the oxygen product tank 40 for use as previously described. At this point, the valves 22 and 27 are closed and valves 70 and 74 are opened. As a result, potassium vapor from the reservoir 66 passes through the line 68 into contact with the metal fluorides in the reactor 10 whereby liquid potassium fluoride is formed in an extremely rapid and vigorous reaction. The potassium fluoride liquid flows into the electrolysis cell 76 where a separation of potassium and fluorine occurs. Valve 87 in line 88 is opened and the pump 86 is actuated to force fluorine evolved at the positive electrode 80 into the fluorine storage chamber 18 for re-use in the next batch operation. At the same time, the valve 83 in line 84 is opened in order that potassium vapor evolved at the negative electrode 78 may be pumped by means of the pump 82 back into the potassium reservoir 66 for re-use in the next batch operation.

As is necessary, potassium vapor may be passed to the potassium iodide column 36 by opening valves 92 and 94 and closing valves 37 and 27. Accordingly, the potassium vapor reacts with the iodide crystals to produce further potassium iodide and thereby regenerate the column 36.

Finally, valves 70 and 74 are closed and the lower gate 16 of the reactor 10 is opened to discharge the free metals and any residual lunar fines material 14 from the reactor thereby completing the process.

The reaction of fluorine with the metal oxides and minerals as described may be carried out at relatively low temperatures such as, for example, about 25° C., since the reaction is exothermic and is substantially independent of initial temperatures as far as reaction mechanisms are concerned. However, maintenance of higher temperatures increases gas diffusion rates thereby expediting reactivity so that higher temperatures (e.g., about 500° C.) are preferred.

It will be recognized that the method and system of apparatus of the present invention provide unique means for producing and recovering oxygen from lunar surface material. By reacting metal oxides of lunar material with fluorine, oxygen is driven off, purified and collected for use in a variety of applications as has been explained. Advantageously, the fluorine is recovered by reacting the metal fluorides with potassium vapor to provide potassium fluoride which is subjected to electrolysis whereby the potassium vapor as well as the fluorine is recycled for further use. As will be appreciated, the present invention provides means for providing high yields of oxygen with minimal product handling problems notwithstanding the fact that fluorine, hydrogen, and potassium likely must be transported to the lunar surface from an Earth source.

The present invention, therefore, is well adapted to carry out the objects and attain the ends and advantages mentioned as well as others inherent therein. While a presently preferred embodiment has been given for the purpose of disclosure, numerous changes in the detail of construction and the combination, shape, size and arrangement of parts may be resorted to without departing from the spirit and scope of the invention as hereinafter claimed. The temperatures and pressures set forth herein are not critical values, but merely are exemplary of values which are suitable, and are well within the knowledge of one having ordinary skill in the art.

What is claimed is:

1. A process for obtaining oxygen from earth and extraterrestrial surface materials containing metal oxides in the group consisting of alumina, silica, calcia, magnesia, iron oxide, and ilmenite, said process comprising the steps of
   (a) reacting the surface materials with fluorine under pressure in the range of 100 torr to 1000 torr and temperature in the range of 0° C. to 800° C. to thereby provide oxygen and metal fluorides,
   (b) reacting the metal fluorides with potassium vapor in a temperature range of 800° C. to 850° C. and pressure in the range of 100 torr to 280 torr to provide potassium fluoride and free metals, and (c) subjecting the potassium fluoride to electrolysis under temperature in the range of 900° C. to 930° C. and pressure in the range of 280 torr to 800 torr whereby potassium and fluorine are separated and recovered to recycle.

2. The process of claim 1 including the additional steps of:
(d) purifying the oxygen, and
(e) collecting the oxygen.

3. The process of claim 2 wherein the oxygen is purified in step (d) by
(d)(1) passing the oxygen stream through a condenser to separate silicon fluoride therefrom by condensation, and
(d)(2) reacting the oxygen stream with potassium iodide for removal of fluorine whereby potassium fluoride and free iodine are provided.

4. The process of claim 3 wherein the free iodine produced in step (d)(2) is reacted with potassium to produce potassium iodide for further use in step (d)(2).

References Cited

UNITED STATES PATENTS

| 2,172,969 | 9/1939 | Eringer | 423—350 |
| 2,941,867 | 6/1960 | Maurer | 423—350 X |
| 466,460 | 1/1892 | Edison | 204—243 R |
| 3,017,254 | 1/1962 | Evans et al. | 23—284 |

FOREIGN PATENTS

| 6614066 | 4/1967 | Netherlands | 23—88 |
| 608,023 | 11/1960 | Canada | 23—89 |

OTHER REFERENCES

Pascal: Nouneau Traité de Chimie Minérale, vol. XVI, Fluor, pp. 64–65 (1960).

OSCAR R. VERTIZ, Primary Examiner

H. S. MILLER, Assistant Examiner

U.S. Cl. X.R.

75—29, 67, 68; 204—243; 423—350